Sept. 23, 1952  W. T. GRAY  2,611,541
RADIATION PYROMETER WITH ILLUMINATOR
Filed Feb. 7, 1950  4 Sheets-Sheet 1

Fig.1-A

*INVENTOR.*
WILLIAM T. GRAY
BY
Woodcock and Phelan
ATTORNEYS

INVENTOR.
WILLIAM T. GRAY
BY
Woodcock and Phelan
ATTORNEYS

Sept. 23, 1952 W. T. GRAY 2,611,541
RADIATION PYROMETER WITH ILLUMINATOR
Filed Feb. 7, 1950 4 Sheets-Sheet 3
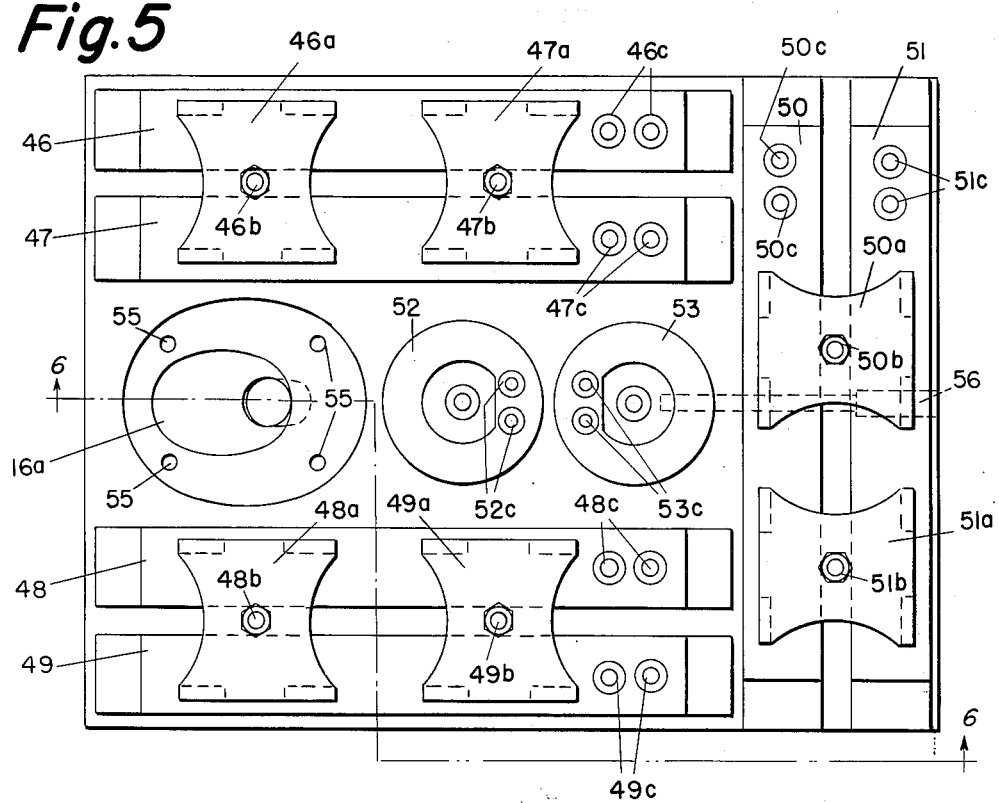
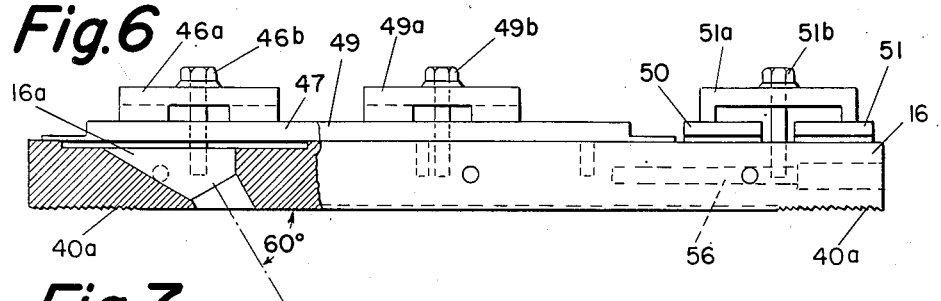
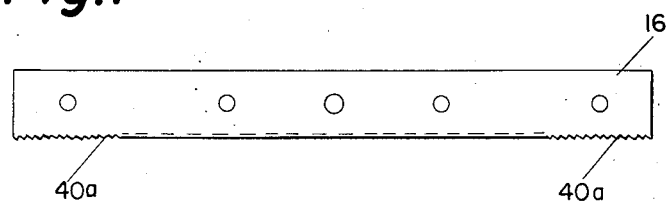
INVENTOR.
WILLIAM T. GRAY
BY
Woodcock and Phelan
ATTORNEYS

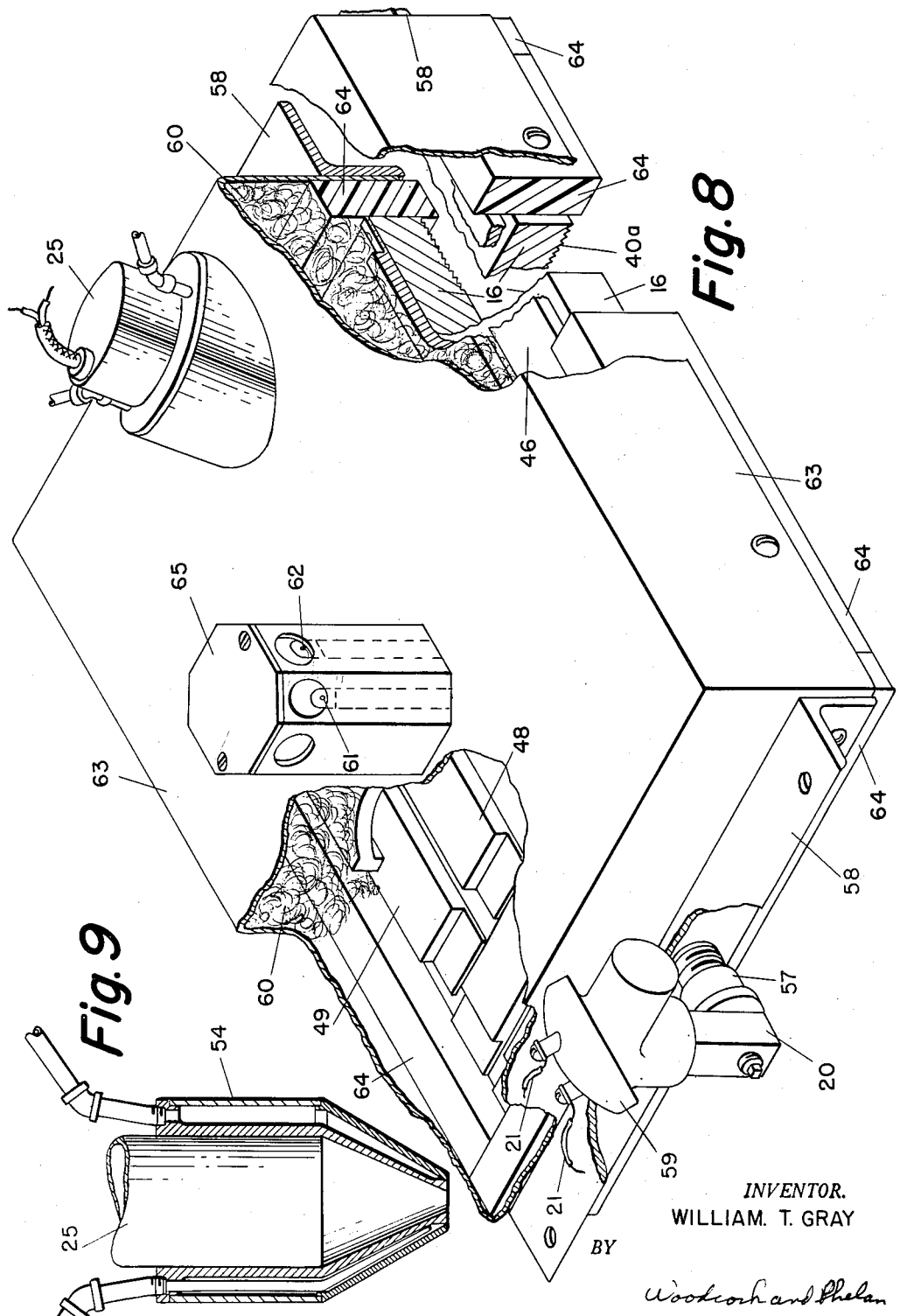

Patented Sept. 23, 1952

2,611,541

UNITED STATES PATENT OFFICE 2,611,541

RADIATION PYROMETER WITH ILLUMINATOR

William T. Gray, Jenkintown, Pa., assignor to Leeds and Northrup Company, Philadelphia, Pa., a corporation of Pennsylvania Application February 7, 1950, Serial No. 142,799

19 Claims. (Cl. 236—15)

This invention relates to methods of and apparatus for measuring and controlling the temperature of a body having a surface from which radiant energy is emitted and has for an object the provision of a temperature-measuring and control system of improved accuracy, notwithstanding non-uniform emissivity of the surface whose temperature is to be measured and controlled.

Heretofore the control of the temperature of non-black-body surfaces by radiant-energy responsive means has involved viewing the surface with an optical or total radiation pyrometer and introducing or applying a correction which at most is approximate. The optical pyrometer is principally used for the measurement of temperatures of the order of 1400° F. and above and has not been satisfactory for the measurement of lower temperatures, of the order of from 800° F. to 1000° F. Efforts have been made to utilize thermocouples in contact with moving sheet aluminum at the lower range of temperature, but readings varied by as much as plus or minus 50° F. In accordance with the present invention a total radiation pyrometer has been satisfactorily utilized to measure temperatures within the range of 800° F. to 1000° F. with errors of the order of plus or minus 5° F. and notwithstanding change in emissivity of the material whose temperature is under measurement or control.

Some of the difficulties encountered with optical pyrometers will be evident by considering a moving work surface such as sheet material in the course of manufacture, new surface areas of which are continuously brought into range of view of a measuring device. The emissivity of such a body or work surface frequently changes in unpredictable manner because of physical differences in different areas of the work surface, changes due to the manufacturing operations, and changes in the surface viewed due to the presence of foreign materials, such as oils, waxes, dirt and the like, having emissivities differing from that of the underlying surface.

A perfect radiator, or black body is characterized by the fact that the energy which it emits depends only on the temperature of the body. A non-black body radiator emits only a fraction of the energy emitted by a perfect radiator, the fraction being known as the emissivity of the body. The emissivity may refer to only a very narrow spectral range, such as is used in optical pyrometry, or a broad spectral range, such as is used in total radiation pyrometers. Thus, in order to relate the energy emitted by a non-black body to temperature, the emissivity must be known. The emissivity of an opaque body is related to its reflectivity by the equation $E+R=1$. When the emissivity is unity, the reflectivity is zero. However, non-black bodies are partial reflectors and their emissivity can never be unity. The total energy leaving an area of a non-black body surface will, in general, be partly emitted radiation and partly reflected radiation. Reflected radiation can cause temperature-measuring errors. For example, a sheet of white paper in daylight appears red hot when measured with an optical pyrometer. When the total of emitted and reflected radiation at every point in the spectral region to which the pyrometer is sensitive is the same as the radiation at every like point in the same spectral region as would be emitted by a black body at the same temperature, black-body conditions are said to exist.

Since in actual practice the opaque bodies or work surfaces whose temperatures are desired to be measured are not perfect black bodies, it follows that the radiation therefrom will not be due to the temperature of the work surfaces alone, since only a part of the radiation falling on them will be absorbed while the remainder will instead be reflected therefrom. Thus, the total radiant energy from a heated opaque work surface will be made up of two components, one due to emission which will be a fraction of the radiant energy which would be emitted from a block body at the same temperature as the work surface, and the other a reflected component due to the reflection of radiant energy from the work surface. When energy in each and all wavelengths utilized in actuating a radiant energy responsive temperature-measuring means has been made to equal the corresponding energy emitted by a black body at the same temperature as the work surface, black-body temperature-measuring conditions will have been attained.

It is an object of the present invention to provide methods of and apparatus for establishing temperature measuring conditions approaching black-body conditions for the measurement of the temperature of a work surface, thus avoiding the need to apply corrections of any kind to the measurement.

It is a further object of the invention to provide a system in which an illuminator is disposed with respect to the work surface whose temperature is to be measured, for multiple reflection of radiant energy therebetween, the illuminator having a peripheral area thereof so constructed and arranged to trap substantially all radiant energy received thereby to avoid measurement errors which would otherwise occur.

It is a further object of the invention to utilize the aforesaid illuminator maintained at a predetermined temperature or control point for the control of the temperature of the work surface with a high degree of accuracy.

In carrying out the present invention in one form thereof an illuminator is designed for disposition adjacent the work surface to provide a measuring zone, the illuminator having a sufficiently large area to insure ten or more reflections of radiant energy directed to a radiation pyrometer, the illuminator also having a formed peripheral area of a character which intercepts all radiant energy received thereby. More specifically, the peripheral area may comprise a plurality of minute black-body cavities as by roughening or sand-blasting the area to make it radiant energy absorbing in character, or preferably may comprise a serrated or sawtooth area which by reason of its orientation effectively prevents the escape of the radiant energy received thereby by directing it back in the direction from which it came for continued multiple reflection between the illuminator and work surface. Upon change of radiant energy received by the radiation pyrometer, the heating device is controlled to change the temperature of the work to elevate or lower the total radiation directed to the pyrometer to maintain the response thereof at a predetermined value corresponding with the control point or selected temperature at which the work surface is to be maintained.

For a more detailed description of the invention and for further objects and advantages thereof, reference is to be had to the following description taken in conjunction with the accompanying drawings, in which:

Fig. 1 diagrammatically illustrates one embodiment of the invention:

Fig. 1-A is an enlarged fractional view of the peripheral area shown in Fig. 1;

Fig. 5 is a plan view of a commercial form of the invention;

Fig. 6 is a side elevation partly in section taken along the line 6—6 in Fig. 5;

Fig. 7 is an end elevation of Fig. 5;

Fig. 8 is a detailed view of a commercial form of the invention with portions thereof broken away for clarity; and Fig. 9 is a sectional view of the type of water jacket utilized for cooling the radiation pyrometer in Fig. 8.

Figure 1:
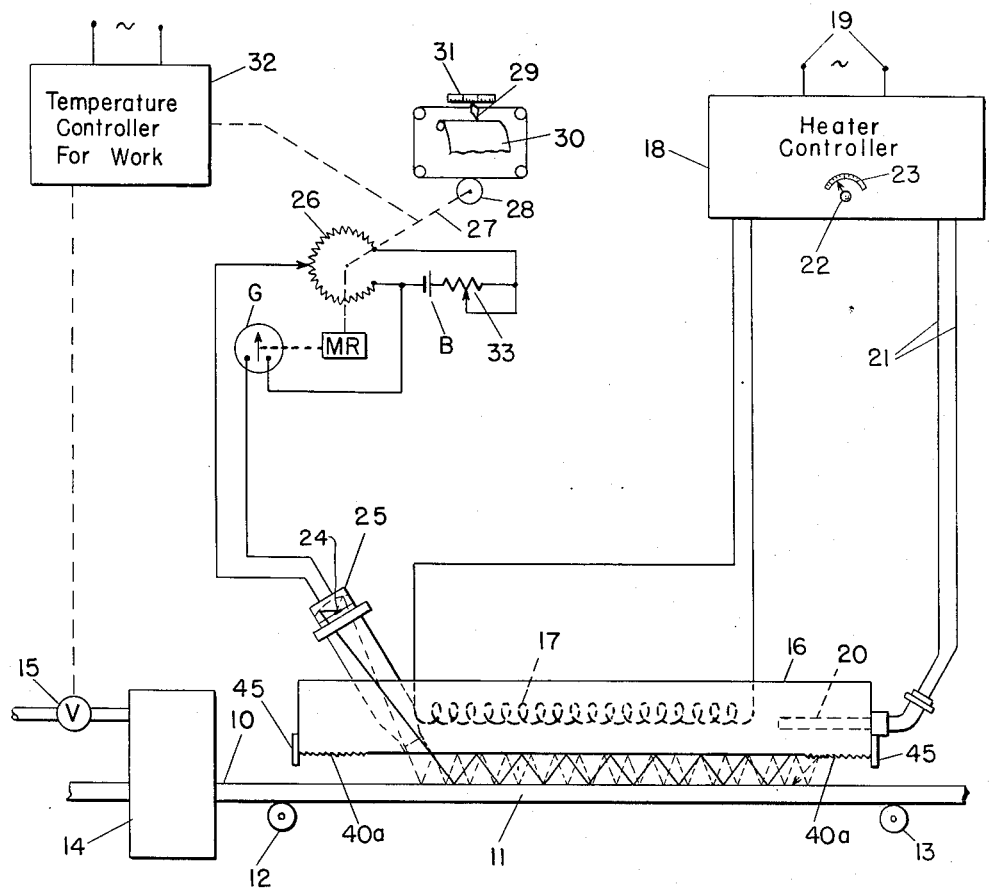
Figure 1:
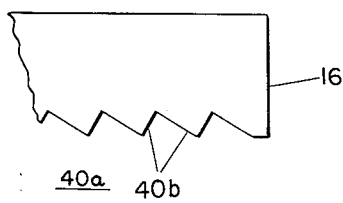

Referring to Fig. 1 the invention in one form has been shown as applied to the temperature measurement of the surface 10 of work 11 which may comprise a traveling sheet of material supported on rollers 12 and 13 and driven for passage through a heat-treating chamber 14, the temperature of which is under the control of a valve 15. Any suitable heating means for the heating zone or chamber 14 may, of course, be utilized, such as electrical resistors, and control of the heating agent may be by variable resistors or variable transformers in the place of the valve 15, the mentioned arrangements being well known to those skilled in the art.

Disposed above the work surface 10 is an illuminator 16 which, in accordance with one embodiment of the invention, has a width of 12" and a length of 16". While the dimensions themselves are not critical and may be varied within wide limits, it is desired that the dimensions be such as to provide ten or more reflections, as will later be explained more in detail.

The illuminator 16 is provided with electrical heating means shown as a heating coil 17 energized under the control of a heater-controller 18 energized from supply lines 19. A temperature responsive device such as a resistance thermometer or thermocouple 20 is disposed in intimate thermal contact with the illuminator 16 with lead wires 21 extending to the heater-controller. The controller itself may be any one of several types known to those skilled in the art and may include a knob 22 and a temperature scale 23 for conveniently setting the control point at the selected temperature at which the work 11 is to be maintained.

A total radiation pyrometer 25, having a sensitive element 24, is suitably supported from or with respect to, the illuminator 16 and has a line of sight disposed to view by reflection extended areas of the work surface 10 and the illuminator 16. The axis of the radiation pyrometer 25 in the form of the invention as illustrated is preferably disposed at an angle of approximately 60° with respect to the plane of the work surface 10. The radiation pyrometer 25 may be connected to any suitable measuring circuit illustrated as of the potentiometer type and including a slidewire 26, a galvanometer G for controlling a mechanical relay MR, which galvanometer and mechanical relay may be of the type disclosed in Squibb Patent 1,935,732, the slidewire shaft thereof indicated by the broken line 27 being effective to drive a pulley 28 to move a pen and indicator 29 relative to a record chart 30 and a scale 31 calibrated for a temperature range within which the work is to be maintained.

Associated with the mechanical relay MR is a temperature controller 32 for the work which is also of any suitable type of which there are a number known to those skilled in the art, as for example, temperature controllers of the type disclosed in Davis Patents 2,300,537 and 2,325,232. For the purposes of the present description it is enough to say that when the temperature of the work 10 varies from the control point, there will be a change in radiation received by the pyrometer 25. The resultant rotation of the slidewire 26 to rebalance the potentiometer measuring circuit including the battery B and the series resistor 33 will cause the temperature controller 32 to function to change the setting of the valve 15 to increase or to decrease the heat applied to the work 11 to bring the work temperature back to the control point. The valve 15 may be cyclically operated between "on" and "off" positions or fractions thereof, with the ratio of the "off" time to the "on" time varied by the controller 32, or the valve 15 may be gradually adjusted to a position to maintain the work 11 at its predetermined temperature.

The present invention is particularly applicable to moving surfaces 10 to which it is impractical to attach thermocouples and the like. In the past the measurement of temperatures of such moving surfaces has proven to be difficult.

In addition to the reasons already discussed, the difficulty in the measurement or control of the temperature of moving surfaces arises from the fact that the emissivity of such surfaces frequently changes, particularly when the manufacturing operation includes the rolling or calendering of the surface of the material. It will be readily understood that if the physical structure of the surface differs along the line of sight of the radiation pyrometer, the emissivity will change because of the change in the character of the surface of the work. Thus, any correction factors which can be applied for an assumed emissivity will be in error if the assumed emissivity changes. However, in accordance with the present invention, the change in emissivity does not adversely affect the measuring or control functions.

In accordance with the present invention, the provision of the illuminator 16 and the further features now to be described provide black-body radiation to the pyrometer 25 or an adequately close approach thereto to result in satisfactory sensitivity and accuracy in the measurement of the temperature of the surface 10.

For the purpose of explaining this invention no mention is made of the spectral character of radiation, i. e. its variation with wavelength. It is not necessary to consider this point here because, although the spectral emissivity may be a function of the wavelength, the arguments hold for each and every wavelength. As an example the surface to be measured may have a high emissivity at one wavelength $\lambda_1$, so that only a few reflections are required to bring the level of radiation up to 99% of black-body radiation at that wavelength, whereas at another wavelength $\lambda_2$ the emissivity may be low enough to require 20 or 30 reflections to bring the level of radiation up to 99% of black-body radiation at that wavelength.

Figure 2:
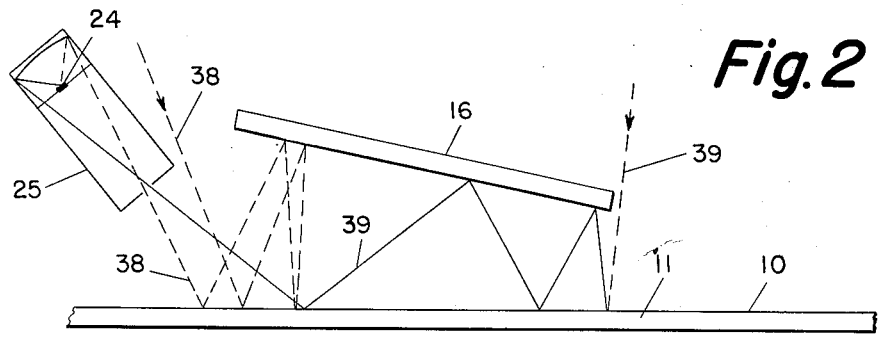
Figs. 2, 3 and 4 are diagrams explanatory of the principles involved and the operation of the embodiment of Fig. 1.

In explaining the principles of operation of the present invention, reference is now to be had to Fig. 2 in which an illuminator 16 is shown disposed at an angle to surface 10 whose temperature is to be measured. A radiation pyrometer 25 is disposed at an angle of between 50° and 60° to the surface 10 to view an area of the surface 10 below the illuminator 16. One of the difficulties with the arrangement illustrated in Fig. 2 is that radiant energy from sources other than the illuminator 16 and the work surface 10 is received by the pyrometer 25. Projecting two extreme rays 38 and 39 from the pyrometer, it will be observed that the ray 38 originates from an external source as indicated by the broken line arrow. The ray 39 also originates from an external source. The ray 38 is twice reflected from the illuminator 16 and thrice reflected from the surface 10 before entering the pyrometer 25, while the ray 39 is similarly twice reflected from the illuminator 16 and thrice reflected from the work surface 10. Since radiant energy from external sources passes with radiant energy originating at the illuminator 16 and at the work surface 10 to the pyrometer 25, it will be understood that external radiation will comprise a part of the energy in each reflected ray and hence will also be received by the pyrometer 25 for all rays intermediate the two limiting rays. Accordingly, with any change in the external radiant energy, there will be variation in the output of the pyrometer 25 not due to any change in the temperature of the work surface 10.

In accordance with the present invention, the foregoing sources of error have been eliminated by the disposition of the illuminator 16 adjacent the work surface 10 with the peripheral area of the illuminator of a character to intercept all radiation received thereby.

Figure 3:
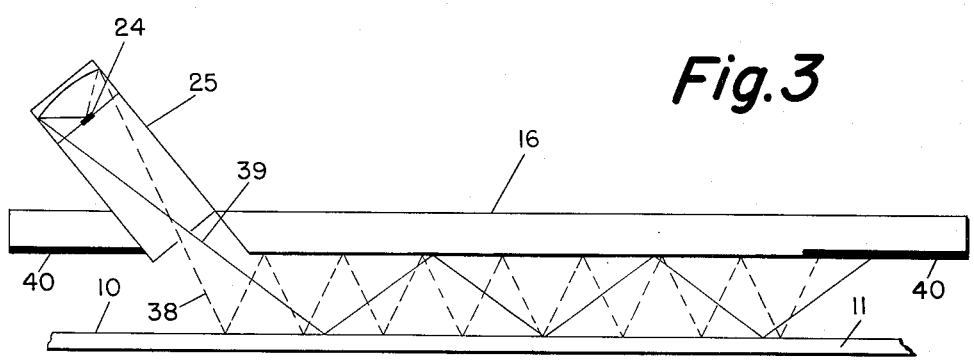

In Fig. 3 the peripheral area 40 may comprise a plurality of minute black-body cavities as by roughening or sand-blasting the area 40 to make it radiant energy absorbing in character. Also, the peripheral area 40 may comprise oxidized copper, though other black surfaces may be utilized, such for example as platinum black and shellac or the like. In Fig. 3 it will be observed that the rays 38 and 39 forming the two extreme limits of rays entering the pyrometer 25 do not originate and cannot originate from external sources. Both originate from the radiant energy emitting peripheral area 40 which will not reflect radiant energy incident thereon from the surface 10. By use of the blackened edge, exterior radiant energy reflected thereto from surface 10 is absorbed and thereby excluded from the system.

In Fig. 1 a peripheral area 40a is shown with serrations formed by sawtooth cuts from the outer edge of the illuminator inwardly thereof for a distance adequate to insure the interception of all the rays capable of augmenting the radiant energy received by the radiation pyrometer and which would otherwise be reflected outwardly of the area between the illuminator 16 and the surface 10. The sawtooth cuts as shown in enlarged Fig. 1-A are oriented to reflect inwardly all rays striking the longer of the two reflecting surfaces, thus preventing loss of such radiant energy from between the adjacent illuminator and work surfaces. It will be observed, Fig. 1-A, that the adjoining faces 40b of each serration are disposed at an angle of 90° with respect to each other, one surface of an adjoining serration forming a part of a 30°–60° triangle, while the other adjacent surface of the serration forms a part of a 60°–30° triangle. The longer surface forming a part of the 30°–60° triangle is directed inwardly of the illuminator 16 for maximum return of reflected radiant energy between the adjacent surfaces of the illuminator 16 and the work 11. The shorter faces are directed outwardly so as to prevent entry of background radiation into the system.

Figure 4:
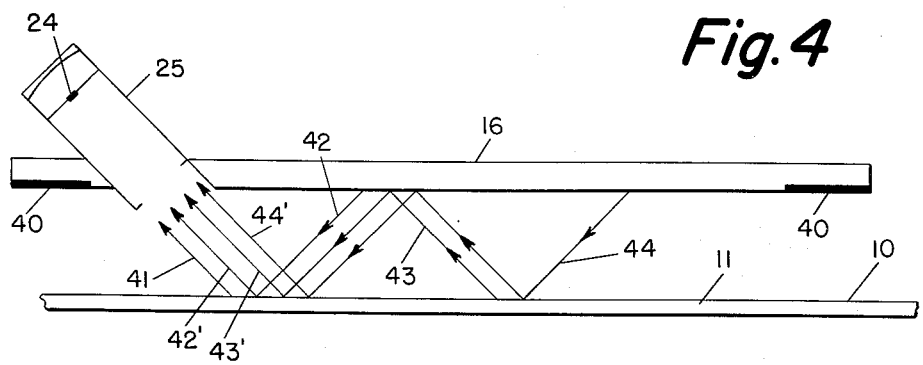

Referring now to Fig. 4, there has been diagrammatically illustrated the radiation pyrometer 25 with a plurality of rays separated one from the other for clarity in illustration, the several rays representing different components of radiant energy from different elements of surfaces. It is to be understood that the structure illustrated in Figs. 1–3 and 5–9 has not been included in Fig. 4, more particularly the restricted opening to the housing of pyrometer 25. Thus, all rays received by the pyrometer 25 will fall within the cone whose outer limits are defined by the rays 38 and 39 of Fig. 3 and would include rays corresponding with those now to be described in connection with Fig. 4. More particularly, there has been illustrated a ray 41 originating at the work surface 10 and entering the radiation pyrometer 25. The radiant energy due to each ray originating solely at the work surface 10 and directly entering the radiation pyrometer in manner to be reflected to the sensitive element 24 may be expressed in terms of radiant energy $J_1$ as follows:

$$J_1 = E' J_{T'(BB)}$$

where $E'$ equals the emissivity of the work surface 10, and
$J_{T'(BB)}$ equals the radiant energy from a black body (BB) at the temperature $T'$ of the work surface 10.

There will be added to the foregoing radiant energy received by the pyrometer 25 a component from the illuminator 16 which is reflected by the work surface 10 to the pyrometer 25.

The radiant energy $J_{16}$ emitted from the illuminator and represented by the ray 42 may be expressed as follows:

$$J_{16} = E'' J_{T''(BB)}$$

where $E''$ is the emissivity of the illuminator 16, and $J_{T''(BB)}$ is the radiant energy emitted from a black body at the temperature $T''$ of the illuminator 16.

The ray 42 is reflected from the surface 10, and the intensity of the reflected ray 42' is, of course, less than the ray 42 incident upon the surface 10, the decrease in intensity being due to the absorption of the surface 10, the absorptive factor being, of course, numerically equal to the emissivity of surface 10. Accordingly, the radiant energy $J_2$ represented by the ray 42' may be expressed as follows:

$$J_2 = E'' J_{T''(BB)} (1-E')$$

A further component of radiant energy received by the pyrometer 25 originates from the surface 10 as represented by the ray 43, is reflected from the illuminator 16, and is again reflected from the surface 10 and directed to the pyrometer 25. The radiant energy $J_3$ represented by the ray 43' may be expressed as follows:

$$J_3 = E' J_{T'(BB)} (1-E'') (1-E')$$

The foregoing expressions represent the manner in which the multiple reflections build up the radiant energy received by pyrometer 25, only a few of such multiple reflections having been illustrated in Fig. 4. With the explanation given, it will be understood that the same type of analysis may be applied for an evaluation of the radiant energy buildup due to multiple reflections. One more example will be given, that of the ray 44 originating from the illuminator 16 reflected from surface 10 to illuminator 16 and reflected from illuminator 16 back upon surface 10 and reflected from surface 10 to the pyrometer 25. The radiant energy $J_4$ represented by the ray 44' may be expressed as follows:

$$J_4 = E'' J_{T''(BB)} (1-E') (1-E'') (1-E')$$

If there were an infinite number of reflections, the illuminator 16 and the surface 10 being at the same temperature, the radiant energy directed to the pyrometer 25 would be equal to that of a black body at the temperature of the surface 10. However, it has been found, in accordance with the present invention, that satisfactory results may be achieved with multiple reflections, preferably above ten, and while a greater number may be provided, it has been found that improved operation for reflection above about twenty scarcely merits the additional size or other design features required to bring about reflections of an order materially above twenty. In this connection it is to be understood that the number of reflections is dependent upon the size of the illuminator 16, the space between it and the surface 10 and the angle of sight of the pyrometer. In the illustrated form of the invention the plate size and plate spacing have been dictated by the practical design limitations for a specific group of applications. An approximate 60° angle of sight has been selected as optimum for the particular apparatus illustrated. With the dimensions as above given and with a space between the lower surface of the illuminator 16 and the surface 10 of about ¾", and the axis of the pyrometer 25 being at approximately 60° to the surface 10, a maximum number of about thirty reflections are obtained, counting each reflection as one whether from the surface 10 or from the illuminator 16.

Inasmuch as the system of Fig. 1 is shown applied to the control of the temperature of the work 11, it will be understood that a change in the temperature of the work 11 will result in a change in the radiant energy received by the radiation pyrometer 25. Accordingly, the sensitivity S of the pyrometer 25 may be defined as the ratio of change in the output of pyrometer 25 for a given change in the temperature of the work surface 10 to the change in the output of the pyrometer 25 receiving radiation from a black body whose temperature is changed by the same amount as that of the work surface 10. The sensitivity S may be expressed as follows:

$$S = \frac{\frac{dJ}{dT'}}{\frac{dJ_{(BB)}}{dT'}} = \frac{E'}{1-(1-E')(1-E'')}$$

Now if the illuminator is a black body, with emissivity $E''$ equal to unity, it is seen from the foregoing equation that the sensitivity S will be equal to the emissivity $E'$ of the work surface 10. However, if the emissivity $E''$ of the illuminator 16 is less than unity, then the sensitivity will be greater than the emissivity $E'$ of the work surface 10, inasmuch as the denominator in the above equation will become smaller.

Inasmuch as decrease in the emissivity $E''$ of the illuminator increases the sensitivity of the system, it is desirable to employ an illuminator 16 having a low emissivity for the measurement of a surface of low emissivity. If the emissivity $E'$ of the surface 10 is small, as for example 0.05, the sensitivity with an illuminator emissivity $E''$ of 1 would be of the order of 0.05, Table I. However, with an illuminator emissivity $E''$ of 0.05, the sensitivity would increase to 0.513, Table I. Accordingly, the illuminator 16 will be constructed of a suitable material to take advantage of the 10-1 increase in sensitivity. For a work surface 10 having an emissivity of 0.5, the sensitivity for an illuminator having an emissivity of unity would be 0.5, Table I, but by providing an illuminator with an emissivity $E''$ of 0.05, the sensitivity may be increased to 0.953, Table I. Those skilled in the art can readily select materials having desired values of emissivity. For example polished aluminum has an emissivity of about 0.05. Other suitable materials include the following: Polished chromium plated iron or copper, polished stainless steel.

A further factor indicating the desirability of a low emissivity for the illuminator resides in the fact that the radiation pyrometer will be more sensitive to temperature variation of the illuminator where its emissivity is high. For an illuminator having an emissivity of unity corresponding with a black body and a surface 10 of emissivity 0.05, the sensitivity S is .05. However, the sensitivity of the radiation pyrometer to change in illuminator temperature may be represented by the expression (1-S). Consequently, the pyrometer sensitivity (0.95) with respect to the temperature variation of the illuminator will be nineteen times as great as its sensitivity to the temperature variation of the work surface 10. Under such circumstances, the temperature of the black-body illuminator must be very carefully controlled because an error or deviation of only 5° F. from the control point will cause an error of 95° F. in the temperature of the work surface 10. However, with the same emissivity of 0.05 for the work surface 10 and with an illuminator emissivity of 0.05, the sensitivity S is increased from 0.05 to 0.513, Table I. In this case and substituting in the expression (1–S), that is (1–0.513), the sensitivity of the pyrometer 25 to changes in the temperature of the illuminator will be 0.487. The pyrometer 25 will be but 0.95 times as sensitive to the temperature variation of the illuminator 16 as to the temperature variation of the work surface 10, instead of nineteen times as in the preceding illustration.

Assuming now that there are 10 reflections of radiant energy between the surface of the illuminator 16 and the work surface 10 and that the emissivity of the work surface 10 is 0.05 and the illuminator 16 has an emissivity of 0.05, then the radiation received by the pyrometer 25 will be 0.431, Table II, of that of a black body at the temperature of work surface 10. By increasing the emissivity of the illuminator to 0.5 the fraction of black-body radiant energy will be increased to 0.979, Table II. With 20 reflections, the foregoing values will be respectively 0.660 and 0.9996, Table III. For work surfaces having an emissivity of 0.5, the fraction of black-body radiation for the illuminator emissivity of 0.05 will be 0.988, for 10 reflections and .999 for an illuminator emissivity of 0.5. Where the work surface emissivity is 0.5, there will be substantial black-body radiation received after 20 reflections, though the illuminator emissivity may be as low as 0.05. The fraction will then be 0.9997 and, of course, more nearly approaches unity as illuminators with higher emissivity are provided.

The foregoing examples reveal the kind of applications to which the invention can most satisfactorily be applied.

A further example will now be considered for a work surface 10 having an emissivity $E'$ of 0.05 and an emissivity $E''$ for the illuminator 16 of 0.25. The pyrometer 25 will receive 96.9% of black-body radiation after 20 reflections. Since the pyrometer 25 responds to the fourth power law, its indication will be low by $$(100-96.9) \div 4 = 0.775\%$$

and this will cause an error of 11.3° F. for a temperature of the work surface 10 of 1,000° F. Were the emissivity of illuminator 16 made lower than 0.25, the error would be larger. While the error may be decreased by using an illuminator of higher emissivity, there would be a resulting loss in sensitivity. Accordingly, a preferred selection of emissivity for the illuminator is 0.25, since the sensitivity is greater by a factor of 3.5 over that which would be obtained with a black-body illuminator, and yet the error is one which is not too great to be tolerated in many applications of the invention.

Further to increase the radiant energy received by the radiation pyrometer 25 and to minimize loss from the region or zone in which conditions of black-body radiation are approached there is provided the blackened peripheral area 40, Figs. 3 and 4, which absorbs substantially all of the radiant energy tending to escape. The complete cone of rays received by radiation pyrometer 25 then originates from an area in a zone in which there is minimized any escape of radiant energy therefrom. It will be seen that the blackened peripheral area 40, as provided in Figs. 3 and 4, supplies black-body background radiation at the temperature of the illuminator 16. This construction provides for a higher sensitivity than could be obtained from an illuminator of similar size without the peripheral area 40. For example, with the illuminator 16 of an emissivity of 0.25 and 20 reflections and the work surface of an emissivity of 0.05, the maximum sensitivity obtainable closely approximates 0.174, Table I. By adding the radiant energy intercepting peripheral area 40 the error due to using only 20 reflections is eliminated so that an illuminator of emissivity .10 can be used, thus increasing the sensitivity to 0.284, Table V, an increase of more than 50%.

However, the use of the blackened peripheral area 40 does not increase the number of reflections between the illuminator 16 and the work surface 10, so that the sensitivity with the peripheral area 40 is less than that for a low emissivity illuminator with infinite reflections, that is to say an illuminator which is infinite in extent. Since it is desirable to increase the number of reflections of the radiant energy between the work surface 10 and the illuminator 16, at the same time retaining an illuminator of relatively small dimensions, the sawtooth construction 40a of Fig. 1-A is to be preferred and in accordance with this feature of the invention there is a desirable increase in sensitivity.

The following tables may be referred to for further illustrations and for further design information useful in applying the present invention to a wide variety of applications:

TABLE I

*Sensitivity values after an unlimited number of reflections*

| Illuminator Emissivity | Surface Emissivity | | | |
|---|---|---|---|---|
| | $E'=.05$ | $E'=.10$ | $E'=.25$ | $E'=.50$ |
| $E''=1.00$ | .050 | .100 | .250 | .500 |
| $E''=.5$ | .095 | .182 | .400 | .667 |
| $E''=.25$ | .174 | .308 | .572 | .800 |
| $E''=.10$ | .345 | .526 | .769 | .910 |
| $E''=.05$ | .513 | .690 | .870 | .953 |
| $E''=0.00$ | 1.000 | 1.000 | 1.000 | 1.000 |

TABLE II

*Fraction of black-body radiation received after 10 reflections*

| Illuminator Emissivity | Surface Emissivity | | | |
|---|---|---|---|---|
| | $E'=.05$ | $E'=.10$ | $E'=.25$ | $E'=.50$ |
| $E''=1.00$ | 1.000 | 1.000 | 1.000 | 1.000 |
| $E''=.5$ | .979 | .985 | .995 | .999 |
| $E''=.25$ | .825 | .874 | .958 | .996 |
| $E''=.10$ | .556 | .686 | .895 | .991 |
| $E''=.05$ | .431 | .588 | .863 | .988 |
| $E''=0.00$ | .265 | .469 | .832 | .984 |

TABLE III

*Fraction of black-body radiation received after 20 reflections*

| Illuminator Emissivity | Surface Emissivity | | | |
|---|---|---|---|---|
| | $E'=.05$ | $E'=.10$ | $E'=.25$ | $E'=.50$ |
| $E''=1.00$ | 1.000 | 1.000 | 1.000 | 1.0000 |
| $E''=.50$ | .9996 | .9998 | 1.000 | 1.0000 |
| $E''=.25$ | .969 | .982 | .998 | 1.0000 |
| $E''=.10$ | .801 | .891 | .985 | .9998 |
| $E''=.05$ | .660 | .816 | .975 | .9997 |
| $E''=0.00$ | .431 | .686 | .958 | .9995 |

TABLE IV

*Sensitivity after 10 reflections with illuminator with radiation retaining peripheral area*

| Illuminator Emissivity | Surface Emissivity | | | |
|---|---|---|---|---|
| | E'=.05 | E'=.10 | E'=.25 | E'=.50 |
| E''=1.00 | .050 | .100 | .250 | .500 |
| E''= .50 | .094 | .180 | .399 | .667 |
| E''= .25 | .153 | .279 | .544 | .798 |
| E''= .10 | .210 | .380 | .697 | .902 |
| E''= .05 | .236 | .421 | .765 | .940 |
| E''=0.00 | .265 | .469 | .832 | .984 |

TABLE V

*Sensitivity after 20 reflections with illuminator with radiation retaining peripheral area*

| Illuminator Emissivity | Surface Emissivity | | | |
|---|---|---|---|---|
| | E'=.05 | E'=.10 | E'=.25 | E'=.50 |
| E''=1.00 | .050 | .100 | .250 | .500 |
| E''= .50 | .095 | .182 | .400 | .667 |
| E''= .25 | .170 | .304 | .570 | .800 |
| E''= .10 | .284 | .475 | .760 | .910 |
| E''= .05 | .348 | .568 | .851 | .953 |
| E''=0.00 | .431 | .686 | .958 | 1.000 |

By providing the illuminator 16 with radiant energy intercepting surface 40 or 40a, the measurement of the temperature of the work surface 10 is made substantially independent of change in emissivity of work surface 10. By utilizing an illuminator surface 12" long and 8" wide with an added 2" radiant energy intercepting peripheral surface, satisfactory temperature measurement was achieved, notwithstanding changes in the emissivity of the surface 10, the illuminator 16 being spaced ¾" from the work surface 10. Skirts 45, Fig. 1, may also be added to the illuminator 16 further to retain within the zone between the two surfaces radiant energy.

Further constructional features of an embodiment of the invention are illustrated in Figs. 5–8 where the illuminator 16 is formed of a polished aluminum plate and is provided with serrated or saw tooth radiation intercepting surfaces 40a. An angularly disposed opening 16a, Fig. 6, the axis of which is approximately 60° from the horizontal plane of illuminator 16, is provided in the illuminator plate through which the radiation pyrometer 25 may be sighted. A series of strip heaters 46–51, Fig. 5, are uniformly distributed over the upper surface of illuminator 16 and are securely attached thereto by means of the corresponding clamps 46a–51a and bolts 46b–51b. Two circular heater strips 52 and 53 are provided substantially to cover the area to one side of the opening 16a for the radiation pyrometer 25.

As shown in Fig. 9, the radiation pyrometer 25 which may be of the type shown in Dike Patent 2,232,594, preferably has its lower end water-cooled as by water jacket 54 which nests within the opening 16a of the illuminator 16, Figs. 5 and 6, a suitable mounting flange being provided with openings through which attaching screws may extend for threaded engagement with the threaded holes 55 in the illuminator 16. A resistance thermometer 20, Fig. 8, is disposed within an opening in the illuminator 16 as indicated by the broken lines 56, Figs. 5 and 6, the resistance thermometer being supported therein by means of a threaded bushing 57, Fig. 8. The upper portion of the illuminator assembly including the heaters is preferably surrounded by a layer of heat-insulating insulation such as glass wool 60, Fig. 8, and an aluminum cap or cover 63 is provided to hold the insulation in place. The several terminals 46c–53c of the corresponding heaters 56–53 are connected to the main input terminals 61–62 by wires omitted for the sake of clarity, it being understood that the heaters 46–53 may be connected in series or parallel as voltage requirements indicate. The terminals are located in a protective housing 65 having knock-out openings for conduit connections. The lead wires 21 from the resistance thermometer 20 extend through the cap 59 for connection to the controller 18 (shown in Fig. 1). An angle 58 forming a structural part of the illuminator assembly is provided at opposite ends of illuminator 16 for mounting the assembly above the work surface 10. The illuminator skirts 45 of Fig. 1 may preferably take the form of the blocks 64, Fig. 8, which surround the peripheral edges of the illuminator 16. These blocks 64 may be constructed from a suitable material such as the material known on the market under the trade-name "Transite" and may serve as bumpers for protecting the polished illuminator surface from being scarred or scratched, should it accidentally come in contact with the work surface 10 beneath it.

It may be further pointed out that to provide a black-body radiant-energy retaining area about the periphery of an aluminum illuminator is difficult to accomplish. The sawtooth profile may be provided in the controlled manner above described so that by proper orientation of the inwardly directed surfaces of the sawteeth substantially all the energy received thereby is returned to the areas within the line of sight of the pyrometer, and in this form represents the embodiment of the invention which has been found satisfactory.

While there have been described preferred embodiments of the invention, it will be understood that further modifications may be made without departing from the spirit and scope of the invention as set forth in the appended claims.

What is claimed is:

1. In a system for controlling the temperature of a work surface comprising an illuminator of substantial area disposed in closely spaced relation with the work surface, a heater for said illuminator, means for controlling the energization of said heater to maintain said illuminator at a predetermined temperature, radiant-energy responsive means having a line of sight disposed to view by reflection extended areas of the illuminator and the work surface, said illuminator having a peripheral area differing from the central area thereof for directing to said radiant-energy responsive means energy received by said peripheral area, and means responsive to the output of said radiant-energy responsive means for maintaining the temperature of the work surface at substantially the same temperature as that of said illuminator.

2. In a system for controlling the temperature of a work surface comprising an illuminator of substantial area disposed in closely spaced relation with the work surface, a heater for said illuminator, means for controlling the energization of said heater to maintain said illuminator at a predetermined temperature, radiant-energy responsive means having a line of sight disposed to view by reflection extended areas of the illuminator and the work surface, said illuminator having a peripheral area differing from the central area thereof for directing to said radiant-energy responsive means energy received by said peripheral area, said peripheral area having a formed surface the elements of which are oriented for reflection of radiant energy in a predetermined direction, and means responsive to the output of said radiant-energy responsive means for maintaining the temperature of the work surface at substantially the same temperature as that of said illuminator.

3. A system for controlling the temperature of a work surface comprising an illuminator having a substantially flat surface area disposed in closely spaced relation with the work surface, a heater for said illuminator, means for controlling the energization of said heater to maintain said illuminator at a predetermined temperature, radiant-energy responsive means having a line of sight disposed to view by reflection extended areas of said illuminator surface and said work surface, said illuminator having a peripheral area having multiple faces for reflecting external radiant energy away from the space between said illuminator and said work surface and for redirecting between said surfaces radiant energy originating from them, and means responsive to the output of said radiant-energy responsive means for maintaining the temperature of the work surface at substantially the same temperature as that of said illuminator.

4. A system for controlling the temperature of a work surface comprising an illuminator of substantial area capable of emitting and reflecting radiant energy disposed in closely spaced relation with the work surface to permit multiple reflections of radiant energy therebetween, a heater for said illuminator, means for controlling the energization of said heater to maintain said illuminator at a predetermined temperature, said illuminator having an opening therethrough, a radiation pyrometer disposed at an angle to the work surface to view through said opening an area of the work surface to receive the radiant energy emitted and reflected therefrom, said illuminator having a peripheral area with a sawtooth profile for minimizing loss of radiation from between said surfaces, and means responsive to the output of said radiant-energy responsive for maintaining the temperature of the work surface at substantially the same temperature as that of said illuminator.

5. In combination, an illuminator of substantial area, means supporting said illuminator with a flat face thereof disposed in closely spaced relation with a work surface from which radiant energy is emitted, radiant-energy responsive means disposed adjacent an edge of said illuminator at an angle to view a sighting area of the work surface such that all of the energy from said sighting area is effective to produce response of said radiant-energy responsive means, and means surrounding the central region of said illuminator for retaining between the work surface and said illuminator radiant energy for multiple reflection therebetween.

6. The combination set forth in claim 5 in which the emissivity of said illuminator is of the same order as that of the work surface.

7. The combination set forth in claim 5 in which the radiant-energy retaining means comprises a peripheral radiant-energy absorbing area surrounding said central region of said illuminator and a skirt surrounding said peripheral area and extending perpendicular therefrom into the area between said illuminator and said work surface.

8. An illuminator for emitting and directing radiant energy to a work surface comprising a substantially flat plate formed of a material providing an emissivity of the same order as that of said work surface, heating resistors uniformly disposed in heating relation with said plate, a housing encasing said plate and heaters with the exposed face of the plate forming an end-enclosure for the housing, heat insulation disposed between the heaters and an outer wall of the housing, said plate having an opening adjacent one edge thereof, a pyrometer having a housing extending into said opening, said pyrometer having a line of sight disposed to view by reflection extended areas of the exposed face of said plate and the work surface, said plate having a peripheral battery area constructed and arranged for minimizing egress of radiant energy from between said plate and the work surface and for minimizing ingress of radiant energy externally of the region between said plate and said work surface, and means for controlling the energization of said heaters to maintain the temperature of said plate at a predetermined value.

9. A system for accurately controlling the temperature of a work surface in accordance with a predetermined temperature and in avoidance of deviation therefrom due to variations in the emissivity of the work surface, comprising an illuminator spaced from the work surface and having a substantially flat surface of less than unity emissivity, means supporting said illuminator surface in closely spaced relation with said work surface for increasing the intensity of radiant energy therebetween by multiple reflection thereof, said illuminator having an opening therethrough adjacent one end thereof, radiant-energy responsive means disposed to view through said opening an area of said work surface directly opposite said illuminator, heating means for said illuminator for supplementing the emitted and multiply reflected radiant energy between said illuminator surface and said work surface to bring the intensity of the radiant energy received by said radiant-energy responsive means from said area to that value which would be emitted by a black body at said predetermined temperature, means for controlling said heating means to maintain said illuminator at said predetermined temperature, said illuminator having a peripheral area for minimizing loss of radiation from between said surfaces, and means responsive to the output of said radiant-energy responsive means for maintaining the temperature of said work surface at substantially the same temperature as that of said illuminator.

10. A system for controlling the temperature of a moving work surface comprising supporting means for maintaining a portion of the work surface in a substantially flat plane, an illuminator of substantial flat area disposed in closely spaced relation with the work surface, a heater for said illuminator, means for controlling the energization of said heater to maintain said illuminator at a predetermined temperature, radiant-energy responsive means supported by said illuminator and having a line of sight disposed to view by reflection extended areas of the illuminator and the work surface, means for retaining between the work surface and said illuminator radiant energy for multiple reflection therebetween comprising a peripheral area surrounding the central region of said illuminator characterized by a plurality of serrations each of which consists of two continuous surfaces, one of them at an angle of about 30° with respect to the flat illuminator surface for directing inwardly of the illuminator radiant energy, and the other of them being at an angle of about 60° with respect to said flat illuminator surface for directing outwardly of said central region radiant energy received thereon, a skirt surrounding the peripheral edge of said illuminator and depending therefrom for aiding said peripheral area to prevent egress of radiant energy from between said illuminator and the work surface and for minimizing ingress of radiant energy externally of the region between said illuminator and the work surface, and means responsive to the output of said radiant-energy responsive means for maintaining the temperature of the work surface at substantially the same temperature as that of said illuminator.

11. In combination, an illuminator having a surface of substantial area, means supporting said illuminator surface in closely spaced relation with a portion of a work surface whose temperature is to be measured, a heater for said illuminator, means for controlling the energization of said heater to maintain said illuminator at a predetermined temperature, radiant energy responsive means having a line of sight disposed concurrently to view by reflection the extended areas of opposed surfaces of said illuminator and the work, said illuminator surface having a peripheral area differing from the central area thereof for directing to said radiant-energy responsive means energy received by said peripheral area, and measuring means operable in accordance with the output of said radiant-energy responsive means.

12. For a pyrometer system, an illuminator having a surface of substantial area spaced from and cooperating with a heated work surface to provide a measuring zone therebetween, heater means for said illuminator surface, radiant-energy responsive measuring means disposed to view by reflection extended areas of the illuminator and work surfaces, said illuminator surface having a peripheral area surfaced to retain between said work and illuminator surfaces the energy radiated from said surfaces, and means controlled to establish equality of the temperatures of said closely spaced heated surfaces for measurement under black-body conditions.

13. An illuminator for a system as defined in claim 12 characterized in that the peripheral area has an emissivity which is substantially unity and surrounds a central area having an emissivity materially less than unity.

14. An illuminator for a system as defined in claim 12 wherein said peripheral area surrounds a flat central area and is characterized by a plurality of serrations, each of which consists of a plurality of surfaces, one of said surfaces being at an angle with respect to said flat central area substantially equal to the angle of incidence of the line of sight of said radiant-energy responsive means for directing radiant energy from the work and illuminator surfaces inwardly of the measuring zone, and another of said surfaces being at an angle not less than the complement of said angle of incidence with respect to said flat central area for redirecting outwardly external radiation otherwise entering said zone.

15. An illuminator for a system as defined in claim 12 wherein said peripheral area surrounds a flat central area and is characterized by a plurality of serrations, each of which consists of a plurality of continuous surfaces, one of them at an angle of about 30° with respect to said flat central area for directing radiant energy from the work and illuminator surfaces inwardly of the measuring zone, and another of them being at an angle at least 60° with respect to said flat central area for redirecting outwardly external radiation otherwise entering said zone.

16. An illuminator having a substantially flat surface area for disposition in closely spaced relation to a heated work surface to provide a measuring zone therebetween, said zone having black-body characteristics as viewed by a pyrometer having a line of sight disposed to view by reflection extended areas of said illuminator and work surfaces, a heater for said illuminator, said illuminator having a peripheral area having multiple faces, part of said multiple faces being oriented for reflecting external radiant energy away from said measuring zone, the remainder of said faces being oriented for redirecting energy radiated from said viewed extended areas inwardly of said measuring zone.

17. An illuminator having a surface of substantial area to be closely spaced from a work surface and heated to the temperature of the work surface to define between said surfaces a pyrometer viewing zone having black-body characteristics, said illuminator surface being characterized by a peripheral area having an emissivity substantially equal to unity to preclude entrance to said zone of extraneous radiation and to prevent escape from said zone of radiant energy within said zone.

18. A housing for a radiation pyrometer having an open end for disposition in closely spaced relation to a heated work surface to define a measuring zone, said housing including heater means and said open end of said housing having a peripheral area characterized by multiple faces, part of said multiple faces being oriented for reflecting external radiant energy away from said measuring zone, the remainder of said faces being oriented for redirecting radiant energy radiated within said zone inwardly of said zone.

19. The method of determining the temperature of a heated work surface which comprises spacing therefrom an illuminator surface to define between said surfaces a measuring zone, effecting equality of the temperatures of said surfaces to establish black-body measuring conditions in said zone, at the boundary of said zone inwardly redirecting energy radiated from said surfaces and outwardly redirecting external radiant energy, and pyrometrically viewing by reflection extended areas of said surfaces within said boundary.

WILLIAM T. GRAY.

REFERENCES CITED

The following references are of record in the file of this patent:

UNITED STATES PATENTS

| Number | Name | Date |
| --- | --- | --- |
| 1,751,070 | Boots et al. | Mar. 18, 1930 |
| 1,901,192 | Reinhardt | Mar. 14, 1933 |
| 1,901,208 | Vayda | Mar. 14, 1933 |